United States Patent
Miyano et al.

(10) Patent No.: US 6,873,769 B2
(45) Date of Patent: Mar. 29, 2005

(54) OPTICAL WAVEGUIDE COUPLER

(75) Inventors: Kenjiro Miyano, Tokyo (JP); Hiroharu Tamaru, Chiba (JP); Hiroshi Ishikawa, Ibaraki (JP)

(73) Assignee: Japan Science and Technology Corporation, Kawaguchi (JP)

( * ) Notice: Subject to any disclaimer, the term of this patent is extended or adjusted under 35 U.S.C. 154(b) by 136 days.

(21) Appl. No.: 10/275,895

(22) PCT Filed: Dec. 12, 2000

(86) PCT No.: PCT/JP00/08775

§ 371 (c)(1), (2), (4) Date: Nov. 12, 2002

(87) PCT Pub. No.: WO01/86330

PCT Pub. Date: Nov. 15, 2001

(65) Prior Publication Data

US 2003/0118270 A1 Jun. 26, 2003

(30) Foreign Application Priority Data

May 12, 2000 (JP) ...................................... 2000-139463

(51) Int. Cl.[7] .............................................. G02B 6/26
(52) U.S. Cl. .............................. 385/50; 385/15; 385/30
(58) Field of Search ............................ 385/14, 15, 30, 385/39, 40, 42, 50, 129–132; 359/341.1

(56) References Cited

U.S. PATENT DOCUMENTS

| | | | | |
|---|---|---|---|---|
| 5,742,633 A | * | 4/1998 | Stone et al. ................... 372/92 |
| 6,259,717 B1 | * | 7/2001 | Stone et al. ................... 372/92 |
| 6,490,039 B2 | * | 12/2002 | Maleki et al. ............... 356/436 |
| 6,580,851 B1 | * | 6/2003 | Vahala et al. ................. 385/30 |
| 6,594,425 B2 | * | 7/2003 | Tapalian et al. .............. 385/50 |
| 6,633,696 B1 | * | 10/2003 | Vahala et al. ................. 385/27 |
| 6,665,476 B2 | * | 12/2003 | Braun et al. ................... 385/50 |
| 2003/0012504 A1 | * | 1/2003 | Iltchenko ...................... 385/39 |
| 2004/0008942 A1 | * | 1/2004 | Scheuer et al. ............... 385/39 |
| 2004/0062476 A1 | * | 4/2004 | Jones ............................ 385/30 |

FOREIGN PATENT DOCUMENTS

JP 52-86044 7/1977

OTHER PUBLICATIONS

H. Ishikawa et al.: "Observation of a modulation effect caused by a microsphere resonator strongly coupled to a dielectric substrate" Optics Letters, vol. 24, No. 10, pp. 643–645 05/99.

* cited by examiner

Primary Examiner—Rodney Bovernick
Assistant Examiner—Kevin S. Wood
(74) Attorney, Agent, or Firm—Oblon, Spivak, McClelland, Maier & Neustadt, P.C.

(57) ABSTRACT

An optical waveguide coupler relaxes a phase matching condition and facilitates coupling between an optical waveguide and a resonator. Light in a multimode optical waveguide is coupled directly to a microsphere resonator via evanescent light. Under a nonresonance condition, influence of the microsphere resonator is small, and light propagation through the multimode optical waveguide is not influenced. However, since the intensity of the light stored in the microsphere resonator is high under the resonance condition, even if the coupling efficiency is low, the microsphere resonator outputs light of approximately the same power as that of the light in the multimode optical waveguide. Therefore, a strong coupling condition is always satisfied, and the optical waveguide coupler functions as a filter due to the interference between the light in the multimode optical waveguide and the light that has passed through the microsphere resonator.

2 Claims, 3 Drawing Sheets

OPTICAL WAVEGUIDE COUPLER

TECHNICAL FIELD

The present invention relates to an optical waveguide coupler and, more particularly, to a technique for relaxing the phase matching condition of a coupler existing in a transmission path.

BACKGROUND ART

Conventionally, when a resonator is connected to an optical waveguide in order to provide a frequency discrimination function, phase matching between the guided mode of the optical waveguide and that of the resonator has been considered important for improving the efficiency of signal transmission between the optical waveguide and the resonator.

DISCLOSURE OF THE INVENTION

Conventional optical waveguide couplers having a wavelength discrimination function require a special design for realizing the phase matching condition to thereby obtain a sufficiently high degree of coupling between a mode in a optical waveguide and that in a coupler. Specifically, the shape of a coupling portion, refraction index of material, coupling length, etc. must be designed precisely in consideration of various factors, such as distortion of the guided modes resulting from the coupling.

A long coupling section has been required to attain sufficiently high transmissibility (see, for example, Japanese Patent Application Laid-Open (kokai) Nos. 07-301716 and 08-248229).

FIG. 1 is a schematic view of such a conventional optical waveguide coupler (optical tapping) (see Japanese Patent Application Laid-Open No. 08-248229). As is apparent from FIG. 1, a long coupling section 31 is needed in order to satisfy the phase matching condition.

In view of the foregoing, an object of the present invention is to provide an optical waveguide coupler which relaxes the phase matching condition of the above-described conventional technique and facilitates the coupling between an optical waveguide and a resonator.

To achieve the above object, the present invention provides the following optical waveguide couplers.

[1] An optical waveguide coupler including a resonator which is in contact with a plurality of optical waveguides and has a wavelength discrimination function, characterized in that a micro-cylinder resonator is sandwiched between two optical circuit boards each carrying a plurality of optical waveguides such that guided light propagating through each optical waveguide of one optical circuit board and having a wavelength satisfying the resonance condition of the resonator propagates via the resonator to the corresponding optical waveguide of the other optical circuit board and exits from an output end of the corresponding optical waveguide, and that, by utilization of a size effect attained through size reduction of the resonator, influence of the resonator on signal transmission between the optical waveguide and the resonator is reduced under a nonresonance condition, and a condition for phase matching between a guided mode of the optical waveguide and that of the resonator is relaxed under a resonance condition.

[2] In the optical waveguide coupler as described above in [1], the size effect of the resonator is such that a size parameter $L/\lambda$ falls within a range of 10 to 100, where L is a peripheral length of the resonator, and $\lambda$ is the wavelength of light in vacuum.

[3] In the optical waveguide coupler as described above in [1] or [2], a micro-resonator is disposed in contact with a multimode optical waveguide in order to provide a function of a notch filter which reduces to zero intensity of light transmitted to a specific mode that satisfies the resonance condition of the multimode optical waveguide and the micro-resonator.

The present invention is characterized in that a condition for phase matching is relaxed greatly by use of a micro-resonator serving as a coupler. That is, an optical waveguide from which evanescent waves leak (e.g., optical fiber having its clad layer removed) is brought into contact with a very small sphere or cylinder so as to obtain an optical waveguide coupler. The relaxation of the phase matching condition occurs due to a small contact point between the very small sphere or cylinder and the optical waveguide. Therefore, the coupling constant of the coupler is small, and in general, the coupler hardly affects the optical waveguide.

Meanwhile, at a wavelength at which light resonates with the resonator, light intensity within the resonator is high. Therefore, even when the coupling is weak, light having a sufficiently high intensity is introduced into the optical waveguide, and is caused to interfere with the guided light. Thus, the coupler exhibits a wavelength discrimination property.

The present invention has the following advantages.

(1) A resonator to be used is very small; and when the resonator is brought into contact with an optical waveguide, a coupling length becomes short, so that the phase matching condition can be relaxed.

(2) Since the density of optical waves within the micro-resonator becomes very high under resonance condition, signal transmission can be performed sufficiently even when the coupling length is short.

As described above, the problems of the conventional technique can be solved by use of a very small resonator.

BEST MODE FOR CARRYING OUT THE INVENTION

Embodiments of the present invention will next be described in detail with reference to the drawings.

Figure 1:
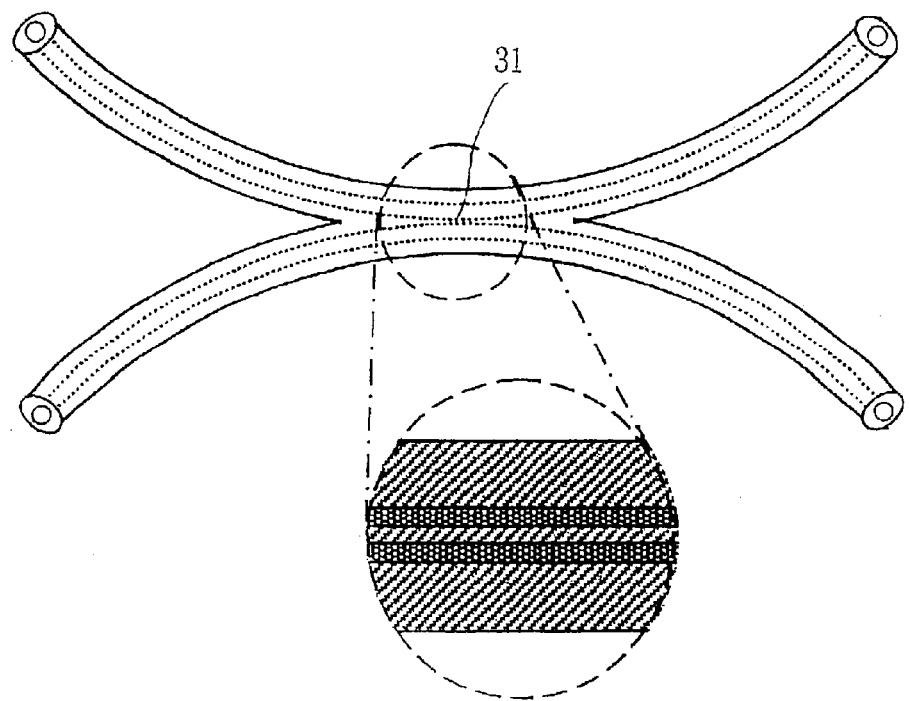
FIG. 1 is a schematic view of a conventional optical waveguide coupler (optical tapping).
Figure 2:
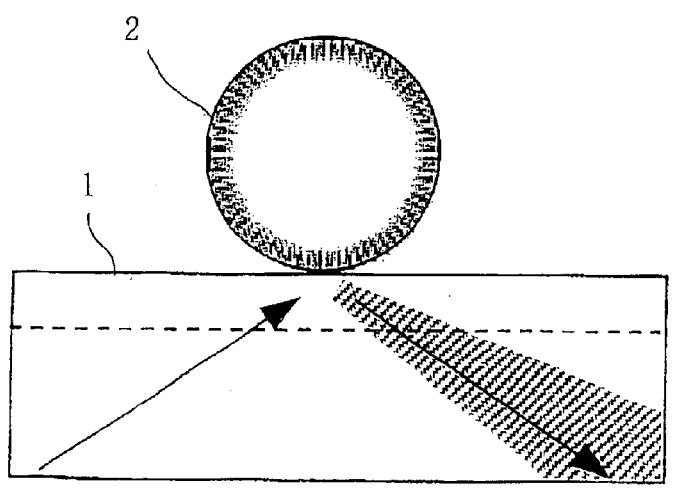
FIG. 2 is a sectional view showing an optical waveguide coupler according to a first embodiment of the present invention.

FIG. 2 is a sectional view of an optical waveguide coupler according to a first embodiment of the present invention in which a multimode optical waveguide and a micro-resonator are in mutual contact.

In FIG. 2, reference numeral 1 denotes a multimode optical waveguide (glass plate whose refraction index is 1.5); and reference numeral 2 denotes a microsphere resonator (a glass sphere whose refraction index is 1.5 and whose diameter is 5 microns) which is in contact with the multimode optical waveguide 1.

An arrow shows a mode to be considered among an innumerable number of modes of the multimode optical waveguide 1; and slanted lines schematically show phase of light; i.e., propagation direction of light within the microsphere resonator 2 and those of light output from the microsphere resonator 2 to the multimode optical waveguide 1. FIG. 2 shows that intensity of output light changes as a result of interference between the two light rays.

Light in the multimode optical waveguide 1 is coupled directly to the microsphere resonator 2 via evanescent waves. Since the size of the microsphere resonator 2 is very small, the efficiency of coupling between the microsphere resonator 2 and the multimode optical waveguide 1 is low. Therefore, under the nonresonance condition, the influence of the microsphere resonator 2 is small, and light propagation through the multimode optical waveguide 1 is not influenced. However, since the intensity of the light stored in the microsphere resonator 2 is high under the resonance condition, even if the coupling efficiency is low, the microsphere resonator 2 outputs light which has approximately the same power as that of the light in the multimode optical waveguide 1. Therefore, strong coupling condition is always satisfied, and the optical coupler functions as a filter by virtue of the interference between the light in the multimode optical waveguide 1 and the light that has passed through the microsphere resonator 2. Here, a normalized propagation coefficient is defined as a ratio of an in-plane component of the wavenumber of the light propagating through the multimode optical waveguide 1 to a value obtained by dividing the wavenumber of light in vacuum by the refraction index of the multimode optical waveguide 1. In the present embodiment, an optimal filter action was experimentally obtained when output to a mode having a normalized propagation coefficient of 0.77 was observed.

Figure 3:
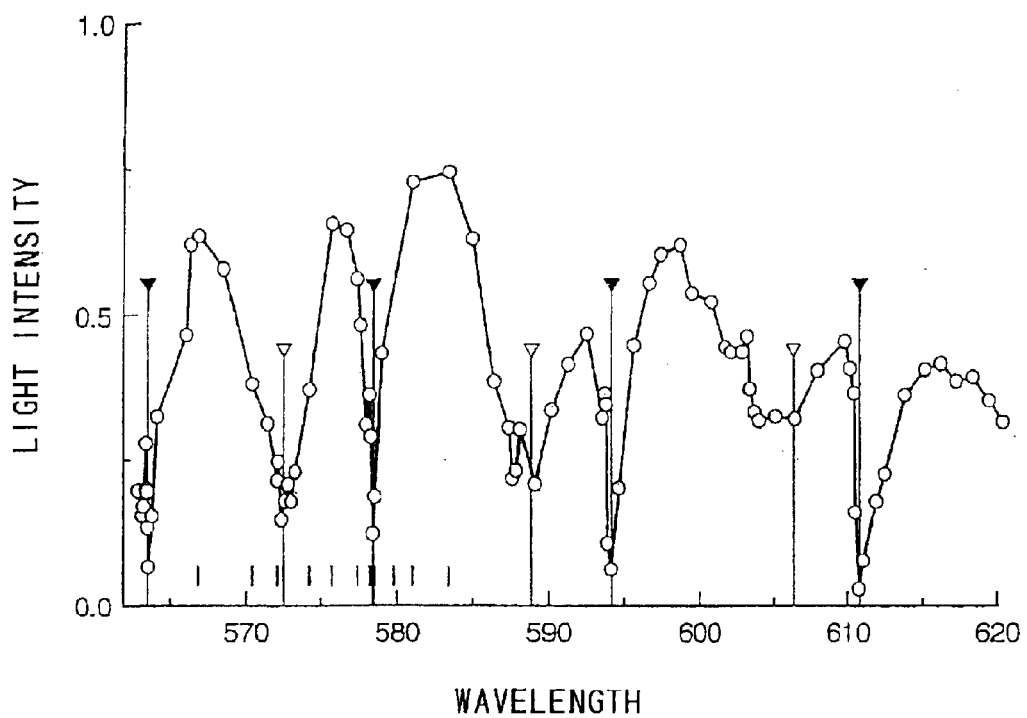
FIG. 3 is a graph showing results of an experiment performed on the wavelength dependency of light intensity of a certain output mode employed in the optical waveguide coupler shown in FIG. 2.

FIG. 3 shows the results of the experiment. In FIG. 3, the vertical axis represents light intensity, and the horizontal axis represents wavelength. The optical waveguide coupler functions as a notch filter which has characteristics such that the intensity of light transmitted to the above-described mode in the multimode optical waveguide 1 becomes zero at certain wavelengths.

Moreover, since the size of the microsphere resonator 2 is very small, the area of contact between the microsphere resonator 2 and the multimode optical waveguide 1 becomes very small, thereby obviating strict holding of a propagation coefficient conservation law (phase matching). Specifically, calculated propagation coefficients of optical modes output from the sphere spread in a wide range as indicated by curve a in FIG. 4, due to a diffraction effect caused by light entering from a very small contact point; and effective coupling is attained if the propagation coefficient of the multimode optical waveguide 1 falls within the spread range.

Figure 4:
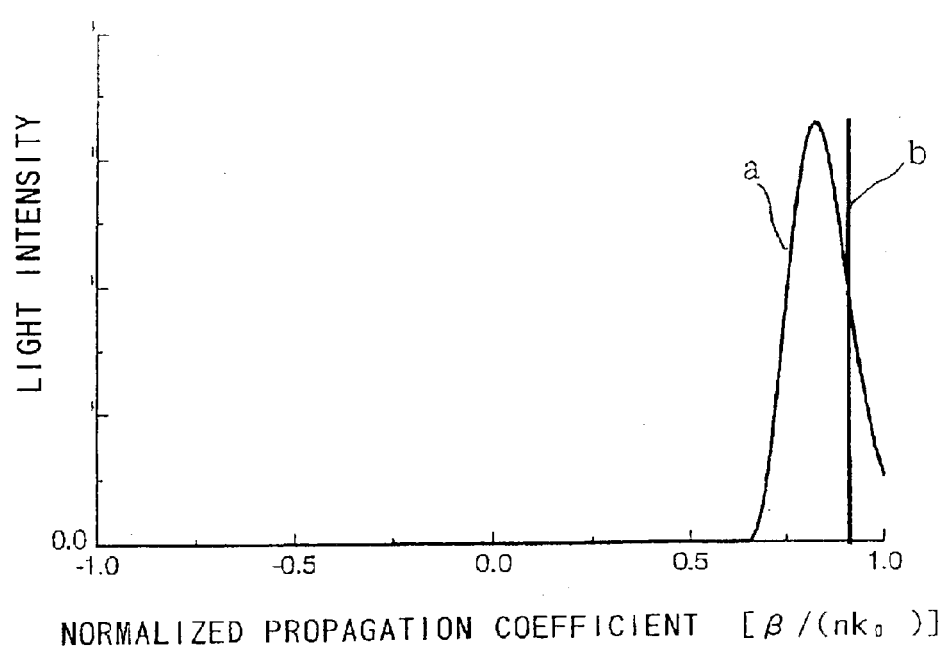
FIG. 4 is a graph showing results of calculation of distribution of propagation coefficients within a multimode optical waveguide for case 1 in which the size parameter of a micro-resonator is 26 and case 2 in which the size parameter is 1000, as well as showing that when the size parameter is small, the resonator can be coupled to a larger number of modes within the optical waveguide.

By contrast, when a large resonator is used, as indicated by line b in FIG. 4, the propagation coefficients of optical modes output from the sphere hardly spread. Therefore, in order to attain effective coupling, the propagation coefficient of the optical waveguide must be made precisely coincide with that of the optical mode output from the sphere. For more general description, a size parameter is defined as the ratio of the resonator peripheral length to the optical wavelength in vacuum. When the size parameter is 100 or less (although a slight change occurs due to changes in the light confinement effect of the resonator depending on refraction index; here, calculation is performed on the assumption that the resonator is formed of a glass sphere whose refraction index is 1.5), the condition of phase matching with the multimode optical waveguide 1 can be relaxed greatly. However, when the spectral width of a resonance mode approaches the mode interval between adjacent resonant modes, a plurality of resonant modes overlap one another. In this case, the optical waveguide coupler does not function as a notch filter. Therefore, the lower limit of the size parameter is determined in view of the above.

The spectral widths of resonance modes and mode intervals are known to exhibit close agreement between their experimental values and calculated values; and these values can be obtained from a size parameter and refraction index. Through such calculation, the lower limit of the size parameter is estimated to be about 10. The characteristic of relaxing the phase matching condition is obtained naturally by use of a revolving-type micro-resonator, irrespective of configuration of the optical waveguide and materials (refraction indexes, distribution relation, etc.) of the optical waveguide and the revolving-type micro-resonator, although the range of the effective size parameter is finely corrected in accordance with the refraction indexes of the optical waveguide and the revolving-type micro-resonator.

Next, a second embodiment of the present invention will be described.

Figure 5:
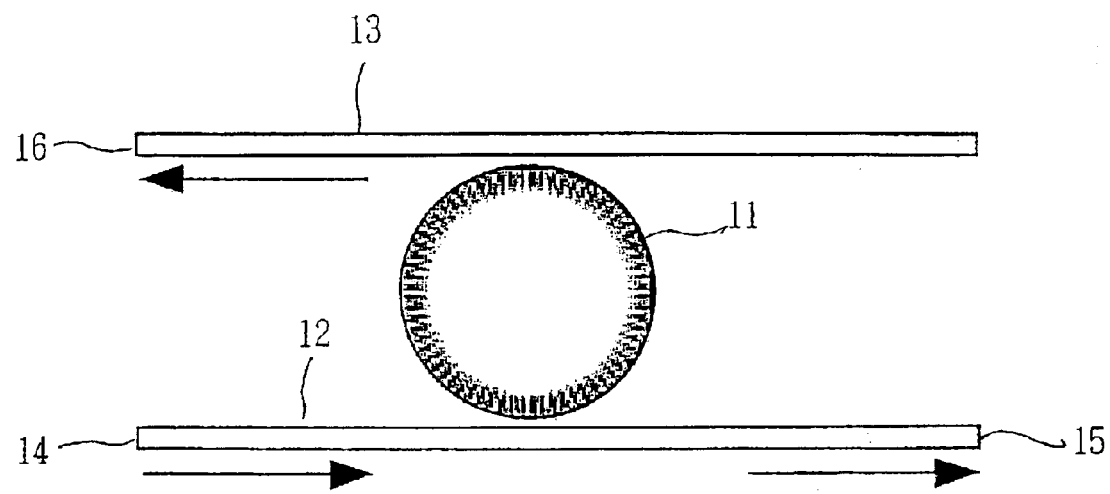
FIG. 5 is a sectional view showing an optical waveguide coupler according to a second embodiment of the present invention.

FIG. 5 is a sectional view of an optical waveguide coupler according to the second embodiment of the present invention, which has a microsphere in contact with two optical waveguides. A cross section of a microsphere resonator 11, which is in contact with two optical waveguides 12 and 13, is shown. Characteristics of an addition filter are produced between an inlet 14 and an outlet 16; and characteristics of a removal filter are produced between the inlet 14 and an outlet 15.

Specifically, the microsphere resonator 11 is formed of a glass sphere (refraction index: 1.5, diameter: 5 microns) and is in contact with two optical waveguides 12 and 13. As described in relation to the first embodiment, the optical waveguide 12 and 13 can assume any form, so long as the optical waveguide 12 and 13 can be coupled to the microsphere resonator 11 via evanescent waves. In the example shown in FIG. 5, an optical fiber having its core exposed is used. The optical waveguide 12 serves as an input waveguide. On the basis of the same principle as that of the first embodiment, strong coupling is always established between the microsphere resonator 11 and the input waveguide 12 and between the microsphere resonator 11 and the output waveguide 13. Therefore, when observed from the inlet 14 of the input waveguide 12, impedance matching is established at all times. Therefore, at wavelengths that satisfy the resonance condition of the resonator, an optical signal is output from the outlet 16 of the waveguide 13 almost completely. At other wavelengths, an optical signal is output from the outlet 15 of the input waveguide 12 almost completely. Thus, through employment of the above-described configuration, an optical channel addition/removal filter is realized with ease.

Next, a third embodiment of the present invention will be described.

Figure 6:
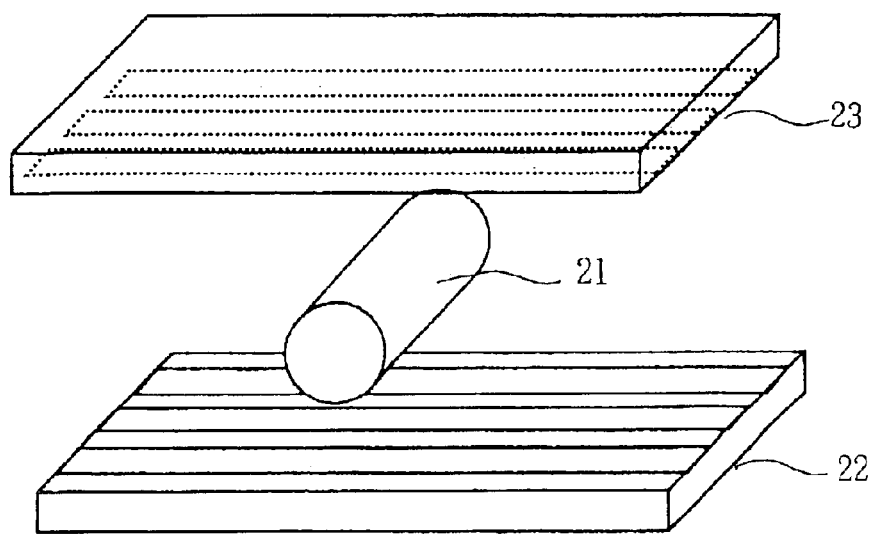
FIG. 6 is a perspective view showing an optical waveguide coupler according to a third embodiment of the present invention.

FIG. 6 is a perspective view of an optical waveguide coupler according to the third embodiment of the present invention, which has a micro-cylinder resonator disposed between two optical circuit boards carrying waveguides on their surfaces which serves as a connector having a wavelength selection function.

As shown in FIG. 6, two optical circuit boards 22 and 23 carrying channel-type waveguides on their surfaces are used as waveguides. Further, a very small cylinder is used as a micro-cylinder resonator 21. The micro-cylinder resonator 21 is sandwiched between the optical circuit boards 22 and 23 to thereby realize an inter-board optical connector having a wavelength filter function by employment of the same principle as that of the second embodiment.

The present invention is not limited to the above-described embodiments. Numerous modifications and variations of the present invention are possible in light of the spirit of the present invention, and they are not excluded from the scope of the present invention.

As described in detail above, the present invention can achieve the following effects.

The present inventors found that the phase matching condition, which has been considered to become important when an optical waveguide is coupled with other optical circuit, is relaxed greatly when the optical waveguide is coupled with a micro-resonator; i.e., the coupling efficiency can be low, because of high Q value of the resonator. This contributes to simplification of design conditions of an optical coupler having a wavelength discrimination function.

When the phase matching condition is relaxed by the present invention, a resonator can be coupled to an optical waveguide, regardless of whether or not their guided modes coincide.

In other words, the present invention provides the following effects.

(1) A resonator to be used is very small; and when the resonator is brought into contact with an optical waveguide, a coupling length becomes short, so that the phase matching condition can be relaxed.

(2) Since the density of optical waves within the micro-resonator becomes very high under resonance condition, signal transmission can be performed sufficiently even when the coupling length is short.

INDUSTRIAL APPLICABILITY

As described above, the optical waveguide coupler according to the present invention is applicable to all fields in which data are transmitted or processed by use of light guided by an optical fiber or an optical circuit.

What is claimed is:

1. An optical waveguide coupler, comprising:
a micro-cylinder resonator which is in contact with a plurality of optical waveguides and has a wavelength discrimination function,
wherein the micro-cylinder resonator is sandwiched between two optical circuit boards each carrying a plurality of optical waveguides such that guided light propagating through each optical waveguide of one optical circuit board and having a wavelength satisfying the resonance condition of the micro-cylinder resonator propagates via the micro-cylinder resonator to the corresponding optical waveguide of the other optical circuit board and exits from an output end of the corresponding optical waveguide, and that, by utilization of a size effect attained through size reduction of the micro-cylinder resonator, influence of the micro-cylinder resonator is reduced under a nonresonance condition, and a condition for phase matching between a guided mode of the optical waveguide and that of the micro-cylinder resonator is relaxed under a resonance condition, and
wherein the micro-cylinder resonator is disposed in contact with a multimode optical waveguide in order to provide a function of a notch filter which reduces a zero intensity of light transmitted to a specific mode that satisfies the resonance condition of the multimode optical waveguide and the micro-cylinder resonator.

2. An optical waveguide coupler, comprising:
a micro-cylinder resonator which is in contact with a plurality of optical waveguides and has a wavelength discrimination function,
wherein the micro-cylinder resonator is sandwiched between two optical circuit boards each carrying a plurality of optical waveguides such that guided light propagating through each optical waveguide of one optical circuit board and having a wavelength satisfying the resonance condition of the micro-cylinder resonator propagates via the micro-cylinder resonator to the corresponding optical waveguide of the other optical circuit board and exits from an output end of the corresponding optical waveguide, and that, by utilization of a size effect attained through size reduction of the micro-cylinder resonator, influence of the micro-cylinder resonator is reduced under a nonresonance condition, and a condition for phase matching between a guided mode of the optical waveguide and that of the micro-cylinder resonator is relaxed under a resonance condition, and
wherein the size effect of the micro-cylinder resonator is such that a size parameter $L/\lambda$ falls within a range of 10 to 100, where L is a peripheral length of the micro-cylinder resonator, and $\lambda$ is the wavelength of light in vacuum, and
wherein the micro-cylinder resonator is disposed in contact with a multimode optical waveguide in order to provide a function of a notch filter which reduces a zero intensity of light transmitted to a specific mode that satisfies the resonance condition of the multimode optical waveguide and the micro-cylinder resonator.

* * * * *